United States Patent
Soni et al.

(10) Patent No.: US 10,168,982 B2
(45) Date of Patent: Jan. 1, 2019

(54) DISPLAY CONTROL OF A PORTION OF A DOCUMENT BY PRIMARY AND SECONDARY DISPLAY DEVICES

(71) Applicant: Adobe Systems Incorporated, San Jose, CA (US)

(72) Inventors: Sachin Soni, New Delhi (IN); Ashish Duggal, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/339,698

(22) Filed: Oct. 31, 2016

(65) Prior Publication Data
US 2018/0121154 A1    May 3, 2018

(51) Int. Cl.
    *G06F 3/14*       (2006.01)
    *G06F 3/0488*     (2013.01)
    *H04L 29/08*      (2006.01)

(52) U.S. Cl.
    CPC ........ *G06F 3/1454* (2013.01); *G06F 3/04883* (2013.01); *G06F 3/1423* (2013.01); *H04L 67/06* (2013.01); *G09G 2370/16* (2013.01); *G09G 2380/02* (2013.01)

(58) Field of Classification Search
    CPC .. G06F 3/1454; G06F 3/1423; G06F 3/04883; H04L 67/06
    See application file for complete search history.

(56) References Cited

U.S. PATENT DOCUMENTS

| | | | |
|---|---|---|---|
| 7,593,141 B2* | 9/2009 | Chiu | H04N 1/00 348/101 |
| 9,171,333 B2* | 10/2015 | Beresford-Wood | G06Q 40/12 |
| 9,286,270 B2* | 3/2016 | Acker | G06F 8/33 |
| 2005/0091612 A1* | 4/2005 | Stabb | G06F 3/0481 715/816 |
| 2009/0063986 A1* | 3/2009 | Cannenisch | G06F 21/64 715/733 |
| 2013/0254659 A1* | 9/2013 | Bedingfield, Sr. | G06F 3/0485 715/273 |
| 2013/0346914 A1* | 12/2013 | Jeong | G06F 3/0485 715/784 |
| 2014/0101577 A1* | 4/2014 | Kwak | G06F 1/1618 715/761 |
| 2015/0199374 A1* | 7/2015 | Bottner | G06F 17/30165 707/608 |

* cited by examiner

*Primary Examiner* — Erin F Heard
(74) *Attorney, Agent, or Firm* — Wolfe-SBMC (57) ABSTRACT

Display control of a portion of a document by primary and secondary display devices is described. In one or more implementations, an input is received to a user interface displaying a document on a primary display device to cause a display of a portion of the document on a secondary display device. A navigation input is then received that causes a navigation of the display of the document on the primary display device while the secondary display device continues to display the portion of the document.

20 Claims, 6 Drawing Sheets

DISPLAY CONTROL OF A PORTION OF A DOCUMENT BY PRIMARY AND SECONDARY DISPLAY DEVICES

BACKGROUND

Modern electronic documents often contain a variety of types of content for consumption by users such as text, media, objects, and so on. Generally, documents are not optimized for a variety of display devices and computing devices that may be used to display the documents. This is due to the vast differences in display device configurations and display device sizes that vastly effect how effectively the content of the documents may be consumed. For example, a document may contain a chart and corresponding text. A user may find it difficult to concurrently view the chart and the text on a small display device such as a mobile phone or tablet.

In order to remedy the problems of viewing a document on a small device, a user may wish to view parts of the document on another display device. Continuing the example above, if a user wanted to display the text on a primary display device and concurrently view the chart on a secondary display device, conventional techniques require that the user open the document on both display devices, separately, and then navigate to the appropriate locations on both display devices. Accordingly, conventional techniques used by computing devices to view a document concurrently with a portion of the document on separate display devices may fail to provide a productive user experience that is friendly to the user.

SUMMARY

Display control of a portion of a document by primary and secondary display devices is described. In one or more implementations, a digital medium environment includes at least one computing device that is configured to control viewing of a single document concurrently on two display devices. For example, the document may be initially displayed in a user interface on a primary display device. During this display, a user input is received via the user interface to cause a display of a portion of the document on a secondary display device. In response, the secondary display device is caused to display the portion of the document. A navigation input may then be received by the primary display device, which then causes navigation of the display of the document on the primary display device. The display of the portion of the document on the secondary display device, however, continues irrespective of the navigation of the document on the primary display device. In this way, the user may freely navigate through the document on the primary display device while still maintaining a view of the portion of the document on the secondary display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Techniques and systems are described that enable display of a document by a primary display device while concurrently displaying a portion of the document on a secondary display device. For example, a primary display device may be included as part of a smartphone and a secondary display device may be implemented separately as a smart television such that a document may be viewed on the smartphone and a portion of the document may be viewed on the smart television.

To begin, a document is displayed in a user interface on the primary display device. The document may comprise any type of electronic document, file, webpage, and so on. An input is then received via the user interface requesting that a portion of the document be displayed on the secondary display device. The input can be made via a mouse input, keyboard key press, touch gesture, or any other suitable input method and may differentiate the portion requested to be displayed by the secondary display device from other parts of the document. For example, if a chart comprises the portion requested to be displayed by the secondary display device, then a gesture directed towards the chart portion of the document within the user interface may be received to initiate the request, e.g., to "cast" that portion toward the secondary display device.

In response, the secondary display device is caused to display the portion of the document. The causing of the display by the secondary display device may be performed through any suitable communications protocol between the primary and secondary display devices, e.g. HTTP, TCP, UDP, ICMP, POP, FTP, IMAP, and so on. The secondary display device may be connected to the primary display device directly, for example two monitors of a computer, or indirectly through communication with a secondary computing device, for example the smartphone and smart television above. The communication between display devices may be any suitable wired or wireless connection such as serial, Ethernet, LAN, Bluetooth, Wi-Fi, Miracast®, Chromecast®, cellular data network, and so on. In order to display the portion of the document, the secondary display device may obtain the portion of the document directly from the primary display device (i.e., the portion is communicated from a computing device of the primary display device to the secondary display device) or receive a network location of the portion of the document from the primary display and retrieve that portion from the network location.

A navigation input may then be received via the user interface of the primary display device to navigate the display of the document on the primary display device. The navigation input, for instance, may initiate scrolling of the document on the primary display device. However, the display of the portion on the secondary display device is configured to remain "as is," regardless of receipt of this input. In this way, the document may be navigated to view other parts of the document on the primary display device while continuing to view the portion of the document on the secondary display device. Thus, the display of the portion on the secondary display device continues irrespective of the display or navigation of the document on the primary display device. For example, a user may be able to view a chart that is part of a document on the secondary display device while concurrently scrolling through text of the document that describes the chart on the primary display device.

An example environment is described that may employ the document display techniques described herein. Example procedures are then described which may be performed in the example environment as well as other environments. Consequently, performance of the example procedures is not limited to the example environment and the example environment is not limited to performance of the example procedures.

Example Environment

Figure 1:
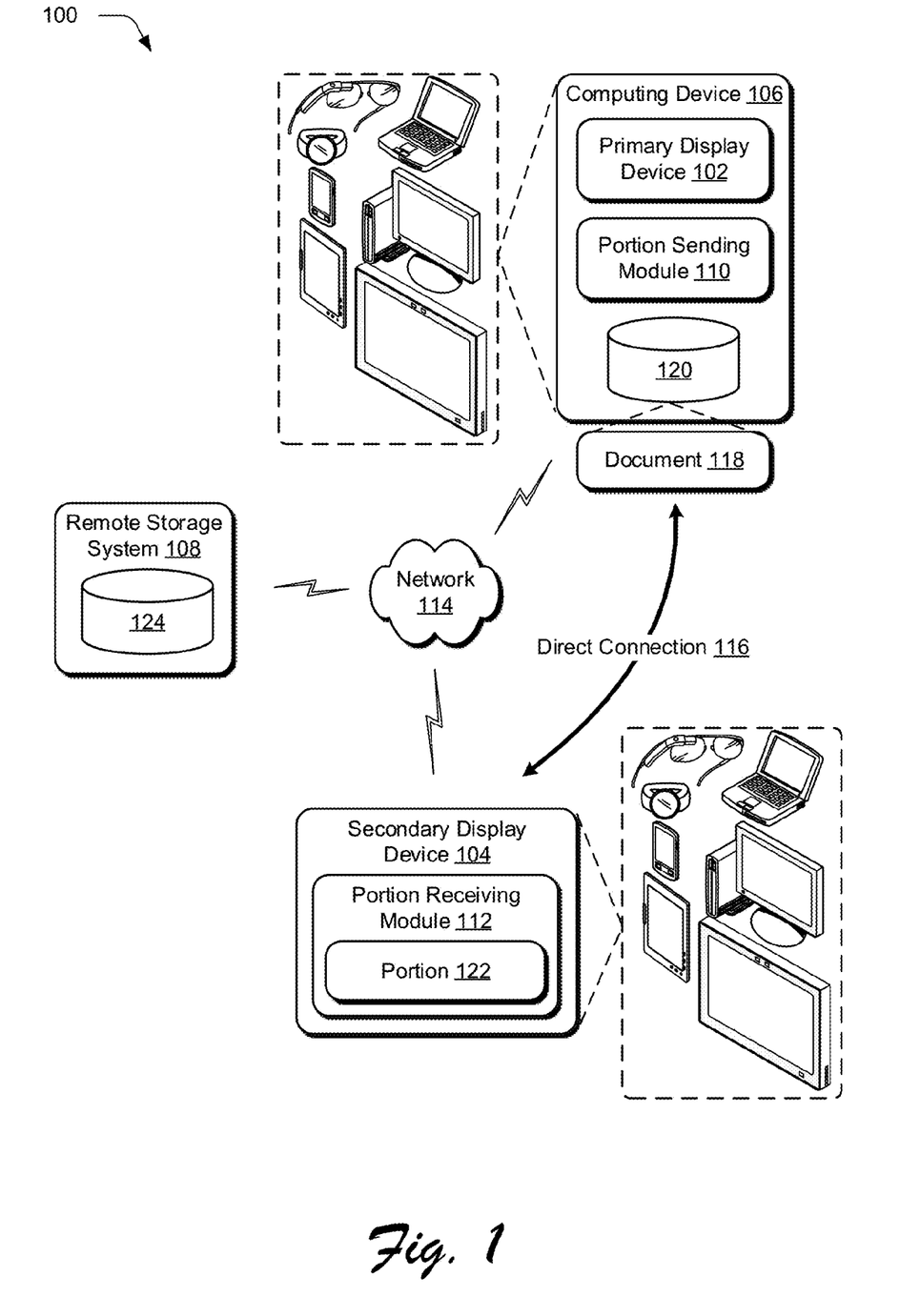
FIG. 1 is an illustration of an environment in an example implementation that is operable to display a document and a portion of the document on primary and secondary display devices.

FIG. 1 depicts an environment, generally at 100, in an example implementation that is operable to enable display of a document by a primary display device while concurrently displaying a portion of the document on a secondary display device. The illustrated environment 100 includes a primary display device 102, a secondary display device 104, a computing device 106, and a remote storage system 108. The computing device 106 contains a portion sending module 110 and the secondary display device 104 contains a portion receiving module 112. The remote storage system 108 is implemented using one or more computing device, e.g., as part of a server farm. The computing device 106, the secondary display device 104, and the remote storage system 108 are communicatively coupled, one to another, via a network 114, e.g., the Internet, a Wi-Fi network (e.g., in accordance with one or more IEEE 802.11 standards), a wireless network, cellular data network, and so forth. Computing device 106 and secondary display device 104 may also be communicatively coupled via a direct connection 116, e.g. Bluetooth, infrared, serial, radio frequency, NFC, and so on.

The primary display device 102 is illustrated as being implemented as part of the computing device 106. The computing device 106 may assume a variety of configurations as illustrated, such as wearable glasses, a laptop, a wearable device, a mobile phone, a tablet computer, a traditional personal computer, a smart television, and so forth. Likewise, the secondary display device 104 may also be implemented as part of a computing device, or may be implemented as a standalone device, e.g., a traditional television with minimal processing capabilities. If the secondary display device is implemented as part of a computing device, the secondary display device 104 may include a processing system that is able to execute instructions to implement the portion receiving module 112. If the secondary display device is implemented as a standalone device such as a computer monitor, then the portion receiving module 112 may be implemented on the computing device 106 and not be part of the secondary display device 104. Although the discussion references primary and secondary display devices by way of example, more than two display devices may also be connected. For example, a portion of a document may be displayed by the primary display device while a different portion of the document is displayed by the secondary display device, all while displaying the document on a third display device.

The computing device 106 is also illustrated as including a document 118 that is stored locally in a storage 122, e.g., using a computer-readable storage medium. The document 118 may take a variety of forms, such as a word processing document, spreadsheet, news article, webpage, presentation, portable document format (PDF), and so forth. Although illustrated as stored locally, the document 118 may also be stored in a storage 124 as part of the remote storage system 108. The remote storage system 108, for instance, may be implemented as part of the "cloud" and accessed via one or more network addresses as further described below in relation to FIG. 6.

The portion sending module 110 is implemented at least partially in hardware of the computing device 106 to cause a display of a portion 122 of the document 118 on the secondary display device 104. This is performed in response to a request received by the computing device 106 via a user interface from a user. The portion sending module 110 may cause the display of the portion 122 in a variety of ways. In a first example, the portion sending module 110 stores the document 118 locally. A portion identified by the user from the document is communicated from the computing device 106 to the secondary display device 104 via the network 114 for receipt by the portion receiving module 112. The communication of the portion 122 to the portion receiving module 112 may be performed through any suitable communications protocol such as HTTP, TCP, UDP, ICMP, POP, FTP, IMAP, and so on. The portion receiving module 112 is implemented at least partially in hardware of the secondary display device 104 to render to the portion 122 for display to a user.

As discussed above, primary display device 102 and secondary display device 104 may comprise two monitors of the computing device 106. In this case the direct connection may be any connection used for display devices such as serial, DVI, display port, HDMI, and so on. Also in this implementation, the portion receiving module 112 may be contained within the computing device 106 such that the computing device 106 sends and receives the portion 122 and causes display of the portion 122 by the secondary display device 104. For example, the document 118 may be displayed within an application window on the primary display device 102. When the request is received to display a portion of the document 118 on the secondary display device 104, the secondary display device 104 may display the portion 122 on the secondary display device 104 outside of the application window on the primary display device 102, i.e. the application window is not "spanned" across the two displays. The portion 118 is then displayed by the secondary display device 104 without a user having to navigate to the portion 118 on the secondary display device 104.

In another example, the document 118 and/or the portion 122 are available via storage 124 of the remote storage system 108. Like the previous example, a user input is received that identifies a portion 122 of the document 118 to be displayed by the secondary display device 104 via interaction with a user interface. In this example, however, the portion sending module 110 communicates a network address (e.g., a URL) via which the portion 122 is available to the secondary display device 104. The portion 122 may be available via the remote storage system 108 as being stored independently on storage 124 or as part of the document 118 stored on storage 124. Regardless of whether the remote storage system 108 contains the document 118 or just the portion 122, the portion receiving module 112, upon receipt of this network address, then obtains the portion 122 from the remote storage system 108 using this network address and then renders the portion for display by the secondary display device 104.

For example, remote storage system 108 may be a hosting service such as YouTube® that contains the portion 122 (a movie in the case of YouTube) or a cloud based document hosting service such as Adobe Creative Cloud® that contains the document 118. Thus, portion sending module 110 may not obtain and send document portion 122 directly but may obtain and send a network location of portion 122 hosted by remote storage system 108. By storing portion 122 remotely on remote storage system 108, document 118 may be a smaller size due to document 118 not containing the actual document portion 118, but rather just a location of portion 122. Once the portion 122 is received by the secondary display device 104, either directly or indirectly through remote storage system 108, the portion 122 is rendered for display by the secondary display device 104. In this way, the portion sending module 110 and the portion receiving module 112 may work in conjunction to expand a user experience involving interaction with the document 118, an example of which is further described below.

Figure 2:
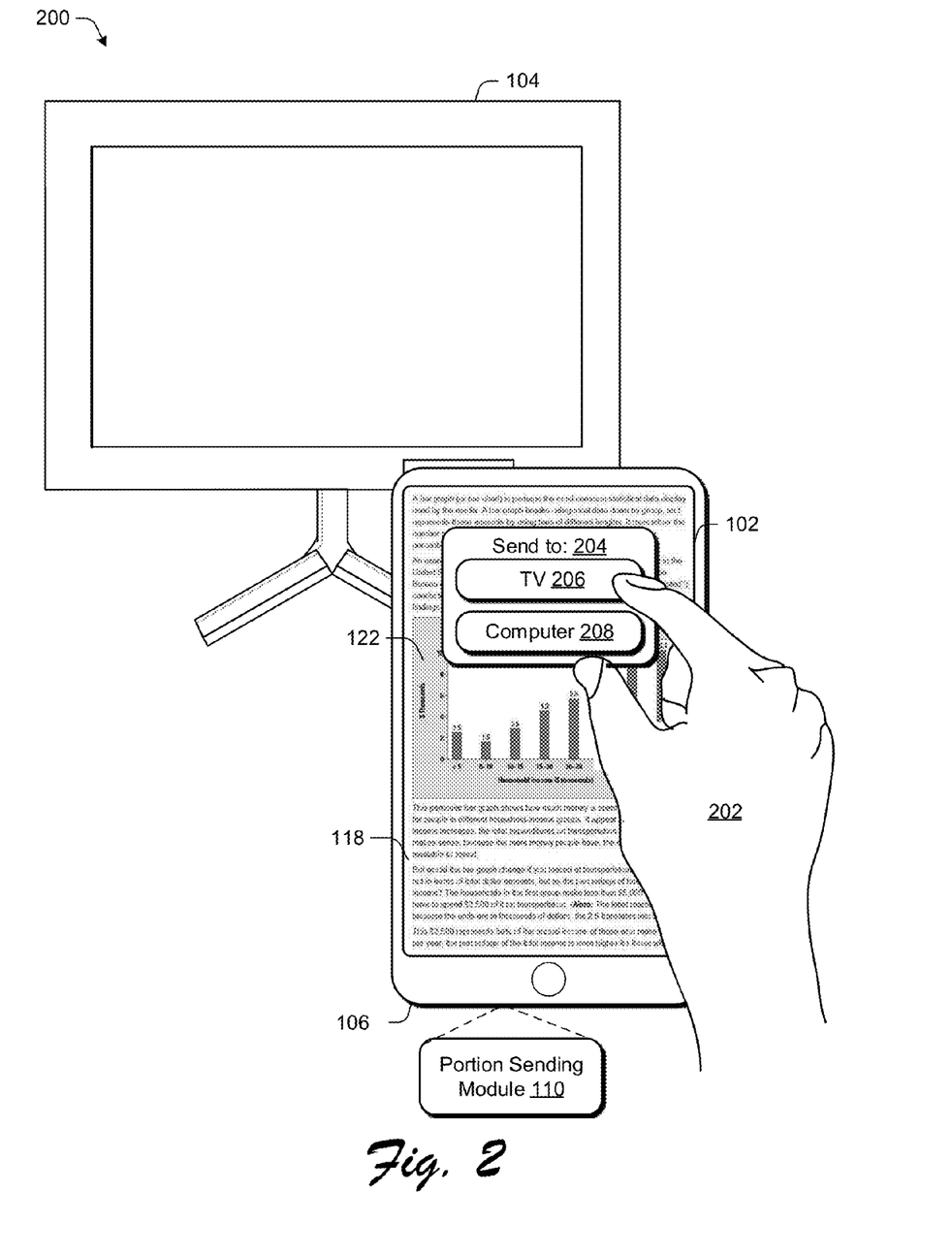
FIG. 2 is an illustration of an example implementation illustrating an input received to a user interface of a primary display device to display a portion of a document on a secondary display device.

FIG. 2 depicts an implementation, generally at 200, showing an example of operation of the portion sending module 110 of FIG. 1. The document 118 and the portion 122 of the document are displayed on the primary display device 102 of the computing device 106, which in this instance is configured as a mobile phone. The document 118 in this example includes text and the portion 122 is configured as a graph. A user input 202 is received via a user interface of the computing device 106 that identifies the portion 122 of the document 118 to be displayed by the secondary display device 104, which in this example is a television. As discussed above, user input 202 may be provided in a variety of ways, such as a gesture, click, keyboard command, and so on. Responsive to receiving user input 202 by the computing device 106, a notification 204 is caused to be output by the portion sending module 110 within a user interface on the primary display device 102.

The notification 204 indicates availability of additional display devices that may be used to render the portion 122. The computing device 106 may detect any nearby secondary display device or may receive a list of available secondary display devices from a network service. The computing device 106 and the secondary display device 104 may have similar applications installed thereon that allow a user to sign in to both devices. This may enable a network service to determine the list of available secondary display devices to display on the computing device 106 by knowing which devices the user is logged into. The applications themselves may also be able to determine, through the direct connection 116, that the user is logged in under the same user account on the respective devices to propagate the list of available secondary display devices. Representations 206, 208 of these display devices are included within the notification 204 and are selectable to cause the portion to be displayed by the represented display devices. In the illustrated example, the user input 202 selects the representation 206 of the TV to cause display of the portion 122 by the TV (i.e., secondary display device 104) as further described below.

Figure 3:
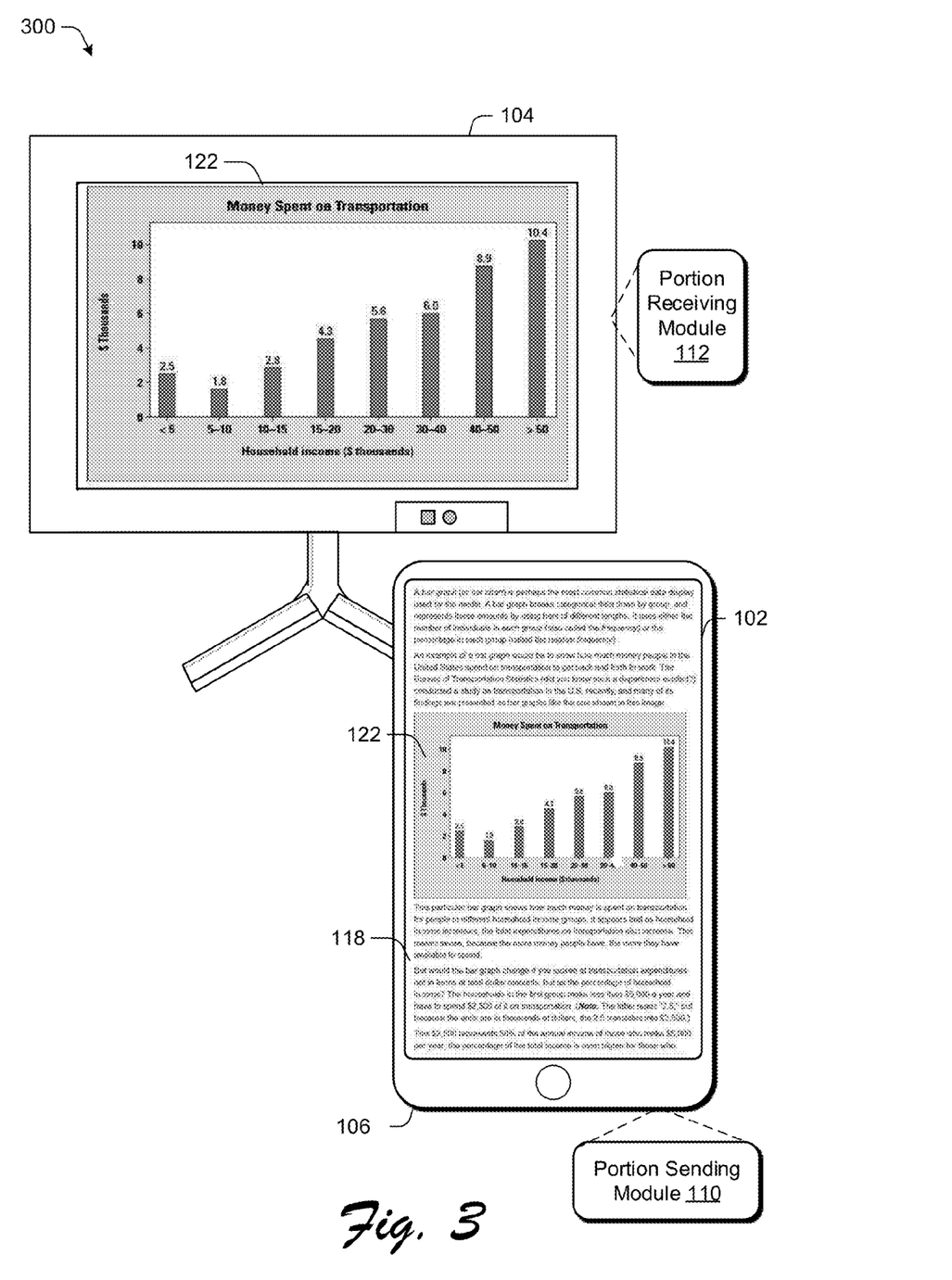
FIG. 3 is an illustration of an example implementation illustrating a display of the portion of the document on the secondary display device responsive to the input received from FIG. 2.

FIG. 3 depicts an example implementation, generally at 300, showing results of a user selection to representation 206 of FIG. 2 to cause display of the portion 122 by the secondary display device 104. When the request to display the portion 122 on secondary display device 104 is received by the portion sending module 110 of the computing device 106, secondary display device 104 is caused to display document portion 122. As discussed above, this may be caused in a variety of ways. For example, the portion sending module 110 may send the portion 122 itself or a network location of the portion 122 to the secondary display device 104 for receipt by the portion receiving module 112. The portion receive module 112 then causes the portion 122 to be rendered by the secondary display device 104. Thus, at this point both the primary and secondary display devices 102, 104 render the portion 122 simultaneously.

Figure 4:
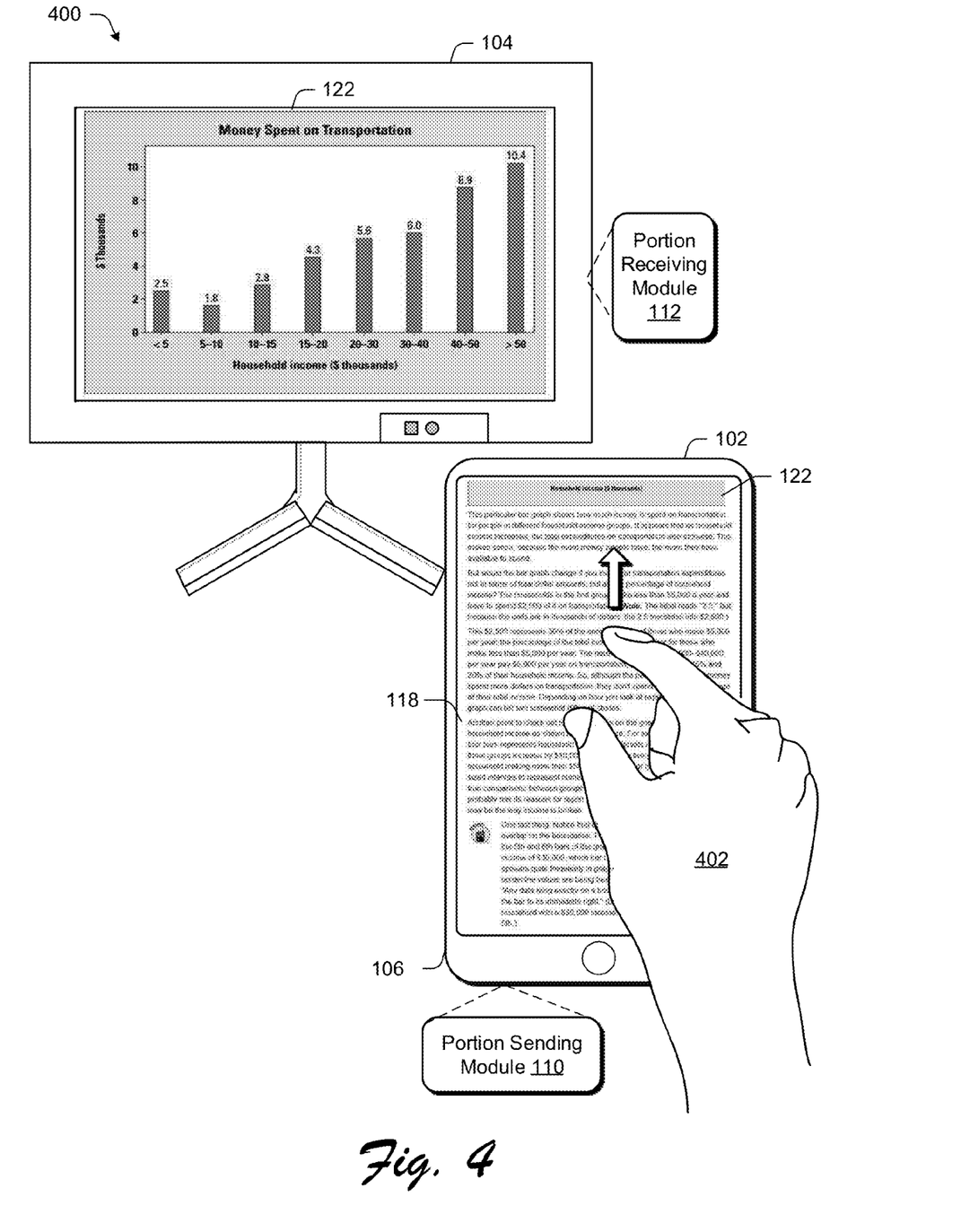
FIG. 4 is an illustration of an example implementation illustrating a navigation input received to the primary display device while continuing to display the portion of the document on the secondary display device.

FIG. 4 depicts an example implementation, generally at 400, showing results of a navigation input 402 received by device 202 after document portion 122 is displayed by the secondary display device 104. A navigation input 402 is received by the computing device 106 to cause navigation within the display of the document 118 within a user interface displayed by the primary display device 102, e.g., a scrolling gesture detected using touchscreen functionality of the primary display device 102. Responsive to receipt of the navigation input 402, the computing device 106 causes the primary display device 102 to navigate the display of document 118. At the same time, the secondary display device 104 continues to display the portion 122 independent from this navigation. The display of the portion 122 continues by the secondary display device 104 even if the navigation of the document 118 on the primary display device 102 continues such that the portion 122 is partially or totally occluded from view.

In this way, a richness of user interaction with the document may be expanded. For example, suppose the graph of the portion 122 is referenced throughout the text of the document 118. Through use of the techniques described herein, the user may navigate through this text of the document 118 on the primary display device 102 yet still view the graph as the portion 122 on the secondary display device 104. Further discussion of these and other examples is included in the following section.

Example Procedures

The following discussion describes displaying a portion of a document on a connected display device that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
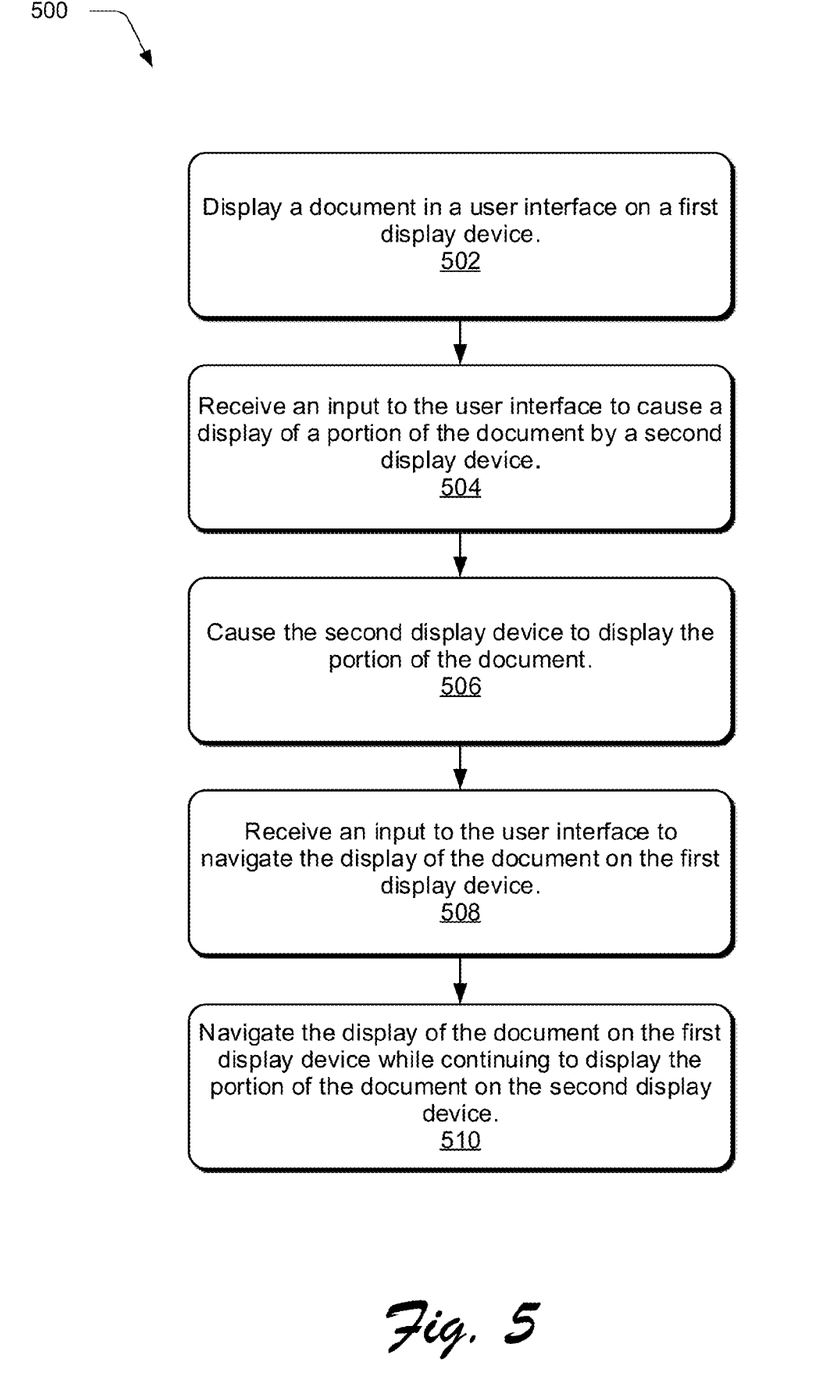
FIG. 5 is a flow diagram depicting procedure to display a document and a portion of the document on primary and secondary display devices.

FIG. 5 depicts, generally at 500, a procedure in an example implementation in which a digital medium environment is configured to display and navigate a display of a document on a primary display device while simultaneously displaying a portion of the document on a secondary display device. To begin, a document is displayed in a user interface on a primary display device (block 502).

Then, an input is received (block 504) to the user interface to cause a display of a portion of the document displayed on the primary display device on a secondary display device. For example, if the document is a PDF that contains pictures, an input may be received to cause a display of one of the pictures on a secondary display device. Responsive to receiving the input at block 504, the secondary display device is caused to display the portion of the document (block 506). In the above example, the primary display device would cause the secondary display device to display the picture. The picture may either be sent to a computing device associated with the secondary display device or a location of the picture may be sent to the computing device associated with the secondary display device as discussed above.

Next, another input is received (block 508) to the user interface to navigate the display of the document on the primary display device. Responsive to receiving the input to navigate the display of the document, the primary display device navigates the display of the document according to the navigation input while the secondary display device continues to display the portion of the document irrespective of the navigation of the document on the primary display device (block 510). Continuing the above example, the PDF may be navigated on the primary display device such that the picture may be occluded from view, however the picture will remain displayed on the secondary display device.

Example System and Device

Figure 6:
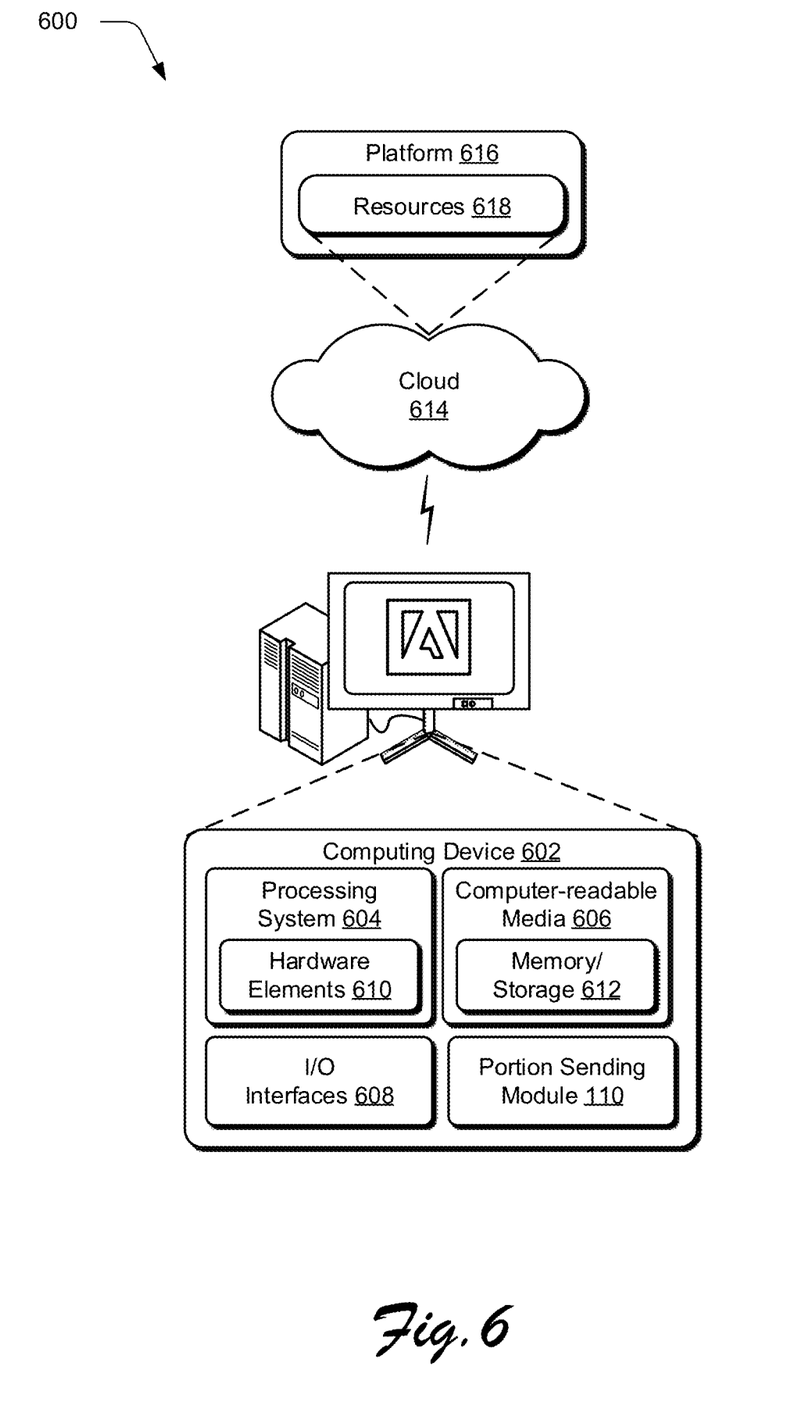
FIG. 6 is an illustration of a system and device in an example implementation that is operable to display a portion of a document on a connected display device as described herein.

FIG. 6 depicts, generally at 600, an example implementation showing an example computing device 602 that is representative of one or more computing systems and/or devices that may implement the various techniques described herein. This is illustrated through inclusion of the portion sending module 110, which may be configured to cause a display of a portion of the document on a connected display device. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device implementation, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device for controlling a view of a document, the method comprising:
   displaying, by the computing device, the document in a user interface on a primary display device;
   receiving, by the computing device, a user input via the user interface to cause display of a portion of the document;
   determining, by the computing device, a secondary display device is available to display the portion of the document responsive to the receiving of the user input, the secondary display device having a different type of configuration than the primary display device;
   displaying, by the computing device, a notification indicating availability of the secondary display device to display the portion of the document;
   receiving, by the computing device, a selection of the secondary display device;
   causing, by the computing device, the selected secondary display device to display the portion of the document responsive to the receiving of the selection by the computing device; and
   responsive to receipt by the computing device of a navigation input via the user interface to navigate the display of the document on the primary display device:
      navigating the display of the document on the primary display device; and
      continuing the display of the portion of the document on the selected secondary display device during the navigating.

2. The method as described in claim 1, wherein the selected secondary display device is connected to the computing device via a wireless network.

3. The method as described in claim 1, further comprising responsive to the receiving of the user input to cause display of the portion of the document by the selected secondary display device, sending, by the computing device, the portion of the document to the selected secondary display device.

4. The method as described in claim 1, further comprising responsive to the receiving of the user input to cause display of the portion of the document by the selected secondary display device, sending, by the computing device, a network location of the portion of the document to the selected secondary display device.

5. The method as described in claim 4, wherein the network location is a uniform resource locator (URL).

6. The method as described in claim 1, wherein the document is accessible via a remote storage system via a network by both the computing device and the selected secondary display device.

7. The method as described in claim 1, wherein the user input includes a gesture that specifies a location of the portion of the document within the document.

8. The method as described in claim 1, wherein the computing device communicates with the selected secondary display device via a direct connection.

9. The method as described in claim 1, wherein the navigation of the document on the primary display device causes the displaying of the portion on the primary display device to cease and the display of the portion of the document on the selected secondary display device to continue.

10. The method as described in claim 1, wherein the document is a portable document format (PDF) document.

11. The method as described in claim 1, wherein the portion of the document is a chart, graph, table, 2D or 3D model, animation, or video embedded within the document.

12. At least one computer-readable storage media device comprising instructions stored thereon that, responsive to execution by a processing system, causes the processing system to perform operations comprising:
displaying a document in a user interface on a primary display device;
receiving a user input via the user interface to cause display of a portion of the document by a secondary display device;
detecting, by the computing device, the secondary display device as available to display the portion of the document responsive to the receiving of the user input, the secondary display device having a different type of configuration than the primary display device;
displaying, by the computing device, a notification indicating availability of the secondary display device to display the portion of the document;
receiving, by the computing device, a selection of the secondary display device;
responsive to the receiving of the user input, causing the secondary display device to display the portion of the document;
responsive to receipt of a navigation input via the user interface to navigate the display of the document on the primary display device, navigating the display of the document on the primary display device; and
continuing the display of the portion of the document on the secondary display device.

13. The at least one computer-readable storage media device as described in claim 12, wherein the user interface comprises an application window for an application that produces the user interface and the portion of the document is displayed outside of the application window on the selected secondary display device.

14. The at least one computer-readable storage media device as described in claim 13, wherein the primary display device and the selected secondary display device comprise two separate devices.

15. A system of controlling a view of a document, the system comprising:
a primary display device; and
a computing device configured for displaying a document on the primary display device, the computing device including:
means for displaying the document within a user interface on the primary display device;
means for detecting a secondary display device as available to display the portion of the document responsive to the receiving of a user input, the secondary display device having a different type of configuration than the primary display device;
means for displaying a notification in the user interface on the primary display device indicating availability of the secondary display device to display the portion of the document;
means for causing a display of a portion of the document on the secondary display device responsive to a selection of the notification; and
responsive to receipt of a navigation input via the user interface, means for causing the primary display device to navigate the display of the document on the primary display device, while causing the secondary display device to continue to display the portion of the document independent from that navigation.

16. The system of claim 15, wherein the secondary display device is associated with a secondary computing device connected to the computing device via a network or direct connection.

17. The system of claim 16, wherein the computing device and the secondary computing device have respective instances of a software application.

18. The system of claim 17, wherein login information for a user is used to sign into the respective instances of the software application.

19. The system of claim 16, wherein the means for causing sends the portion of the document to the secondary computing device.

20. The system of claim 16, wherein the means for causing sends a network location of the portion of the document to the secondary computing device.

* * * * *